US005117302A

United States Patent [19]
Lipton

[11] Patent Number: 5,117,302
[45] Date of Patent: May 26, 1992

[54] HIGH DYNAMIC RANGE ELECTRO-OPTICAL SHUTTER FOR STEROSCOPIC AND OTHER APPLICATIONS

[75] Inventor: Lenny Lipton, Greenbrae, Calif.

[73] Assignee: StereoGraphics Corporation, San Rafael, Calif.

[21] Appl. No.: 762,655

[22] Filed: Sep. 19, 1991

Related U.S. Application Data

[63] Continuation of Ser. No. 509,329, Apr. 13, 1990, abandoned.

[51] Int. Cl.$^5$ .................. G02B 26/02; G02F 1/13; H04N 13/00
[52] U.S. Cl. ................... 359/227; 359/63; 359/900; 358/92
[58] Field of Search ........... 350/266, 269, 270, 337, 350/331 R, 130, 132; 358/88, 92; 359/227, 230, 231, 53, 55, 63, 900

[56] References Cited

U.S. PATENT DOCUMENTS

| | | |
|---|---|---|
| 3,731,986 | 5/1973 | Fergason .................. 350/337 |
| 4,562,463 | 12/1985 | Lipton ...................... 358/88 |
| 4,792,850 | 12/1988 | Lipton et al. .............. 358/92 |
| 4,884,876 | 12/1989 | Lipton et al. .............. 359/63 |
| 4,967,268 | 10/1990 | Liptone et al. ............ 358/92 |
| 5,054,891 | 10/1991 | Masakatsu ................ 359/63 |

OTHER PUBLICATIONS

Lipton, "Factors affecting 'ghosting' in time-multiplexed plano-stereoscopic CRT display systems," SPIE Proceedings, vol. 761, 1987.

Havens, "A liquid-crystal video stereoscope with high extinction ratios, a 28% transmission state, and one--hundred-microsecond switching," SPIE Proceedings, vol. 761, pp. 23-26, 1987.

Primary Examiner—Bruce Y. Arnold
Assistant Examiner—James Phan
Attorney, Agent, or Firm—Limbach & Limbach

[57] ABSTRACT

A high dynamic range electro-optical shutter for stereoscopic and other applications, and a method for increasing the dynamic range of an electro-optical shutter system. The shutter of the invention is derived from an existing electro-optical shutter by adjusting the tilt angle of the plane of the shutter's surface in the optical path of the apparatus in which it is employed. The invention is based upon the finding that light rays transversing an electro-optical shutter which are not perpendicularly to the plane in which a surface of the shutter lies, can have a significantly higher dynamic range than axial rays. In accordance with the invention, the angle at which the shutter is mounted in an apparatus is adjusted to produce a dynamic range which is high enough for the intended application. By mapping the pattern of spatial distribution of dynamic range, it is possible to design and produce shutters which are low in manufacturing cost, yet have performance which equals that of more costly shutters.

10 Claims, 4 Drawing Sheets

| | HORIZONTAL AXIS | | | | | | | | |
|---|---|---|---|---|---|---|---|---|---|
| | 340 | 345 | 350 | 355 | 0 | 5 | 10 | 15 | 20 |
| 20 | 186 | 313 | 535 | 758 | 487 | 350 | 227 | 142 | 99 |
| 15 | 284 | 413 | 606 | 758 | 650 | 478 | 325 | 211 | 151 |
| 10 | 535 | 650 | 758 | 827 | 700 | 535 | 413 | 325 | 211 |
| 5 | 758 | 827 | 827 | 758 | 700 | 606 | 535 | 478 | 433 |
| 0 | 650 | 650 | 650 | 700 | 700 | 700 | 700 | 700 | 700 |
| 355 | 337 | 413 | 505 | 568 | 700 | 758 | 827 | 827 | 827 |
| 350 | 189 | 260 | 455 | 700 | 827 | 827 | 650 | 505 | 455 |
| 345 | 129 | 171 | 267 | 395 | 700 | 827 | 650 | 433 | 275 |
| 340 | 85 | 122 | 193 | 350 | 650 | 758 | 535 | 275 | 171 |

VERTICAL AXIS (left label)

POLARIZER

FIG. 3 ACHROMATIC 7 MICRON CELL

HORIZONTAL AXIS

| | 340 | 345 | 350 | 355 | 0 | 5 | 10 | 15 | 20 |
|---|---|---|---|---|---|---|---|---|---|
| 20 | 9 | 13 | 20 | 100 | 357 | 250 | 60 | 27 | 15 |
| 15 | 19 | 35 | 80 | 166 | 416 | 250 | 96 | 41 | 25 |
| 10 | 41 | 70 | 138 | 250 | 500 | 357 | 166 | 80 | 50 |
| 5 | 166 | 250 | 312 | 416 | 500 | 416 | 312 | 227 | 156 |
| 0 | 450 | 450 | 500 | 500 | 500 | 500 | 500 | 416 | 416 |
| 355 | 130 | 147 | 250 | 357 | 500 | 416 | 312 | 208 | 208 |
| 350 | 35 | 50 | 119 | 250 | 416 | 277 | 138 | 80 | 41 |
| 345 | 20 | 31 | 60 | 166 | 416 | 208 | 83 | 41 | 25 |
| 340 | 14 | 23 | 50 | 138 | 312 | 208 | 50 | 22 | 14 |

(VERTICAL AXIS)

FIG. 4 9 MICRON CELL

HORIZONTAL AXIS

| | 340 | 345 | 350 | 355 | 0 | 5 | 10 | 15 | 20 |
|---|---|---|---|---|---|---|---|---|---|
| 20 | 227 | 227 | 119 | 50 | 19 | 10 | 7 | 5 | 4 |
| 15 | 277 | 113 | 62 | 31 | 17 | 11 | 8 | 7 | 5 |
| 10 | 83 | 50 | 31 | 23 | 18 | 13 | 10 | 8 | 7 |
| 5 | 25 | 23 | 21 | 18 | 17 | 16 | 13 | 13 | 13 |
| 0 | 16 | 15 | 15 | 16 | 16 | 16 | 18 | 18 | 20 |
| 355 | 8 | 10 | 11 | 13 | 17 | 20 | 25 | 32 | 35 |
| 350 | 5 | 7 | 8 | 12 | 15 | 25 | 35 | 50 | 50 |
| 345 | 4 | 5 | 7 | 9 | 16 | 28 | 50 | 50 | 31 |
| 340 | 3 | 5 | 7 | 8 | 16 | 31 | 41 | 25 | 14 |

(VERTICAL AXIS)

FIG. 5  7 MICRON CELL

HORIZONTAL AXIS

| | 340 | 345 | 350 | 355 | 0 | 5 | 10 | 15 | 20 |
|---|---|---|---|---|---|---|---|---|---|
| 20 | 36 | 147 | 500 | 75 | 25 | 10 | 7 | 4 | 3 |
| 15 | 192 | 500 | 156 | 50 | 25 | 115 | 8 | 6 | 5 |
| 10 | 250 | 125 | 62 | 31 | 20 | 15 | 12 | 8 | 7 |
| 5 | 41 | 35 | 27 | 25 | 20 | 18 | 15 | 13 | 12 |
| 0 | 16 | 16 | 16 | 18 | 20 | 20 | 20 | 22 | 22 |
| 355 | 8 | 10 | 11 | 14 | 19 | 25 | 35 | 50 | 62 |
| 350 | 4 | 6 | 8 | 12 | 19 | 31 | 62 | 147 | 192 |
| 345 | 3 | 5 | 6 | 10 | 18 | 35 | 83 | 192 | 70 |
| 340 | 3 | 4 | 6 | 10 | 20 | 50 | 208 | 70 | 25 |

(VERTICAL AXIS)

FIG. 6  6 MICRON CELL

HORIZONTAL AXIS

| | 340 | 345 | 350 | 355 | 0 | 5 | 10 | 15 | 20 |
|---|---|---|---|---|---|---|---|---|---|
| 20 | 50 | 156 | 357 | 166 | 62 | 15 | 10 | 7 | 6 |
| 15 | 156 | 357 | 357 | 125 | 50 | 27 | 16 | 12 | 9 |
| 10 | 416 | 312 | 147 | 83 | 50 | 35 | 22 | 16 | 14 |
| 5 | 119 | 92 | 70 | 62 | 50 | 41 | 35 | 27 | 25 |
| 0 | 35 | 41 | 41 | 41 | 41 | 50 | 50 | 50 | 50 |
| 355 | 18 | 20 | 25 | 35 | 41 | 62 | 83 | 125 | 250 |
| 350 | 10 | 13 | 18 | 27 | 41 | 83 | 166 | 250 | 208 |
| 345 | 7 | 10 | 13 | 23 | 41 | 108 | 250 | 166 | 62 |
| 340 | 4 | 7 | 12 | 21 | 41 | 125 | 208 | 70 | 31 |

(VERTICAL AXIS)

HIGH DYNAMIC RANGE ELECTRO-OPTICAL SHUTTER FOR STEROSCOPIC AND OTHER APPLICATIONS

This is a continuation of co-pending application Ser. No. 07/509,329, filed on Apr. 13, 1990, now abandoned.

FIELD OF THE INVENTION

The invention is a high dynamic range electrooptical shutter for stereoscopic and other applications, and a method for increasing the dynamic range of an electrooptical shutter system.

BACKGROUND OF THE INVENTION

Prior art electro-optical shutters, specifically liquid crystal devices, have had a limited dynamic range (ratio of maximum light transmitted to minimum light transmitted), making them difficult to employ in certain applications. In particular, the surface mode liquid crystal device, which is commonly used in stereoscopic applications, has an on-axis dynamic range measuring about 30:1. Experiments have shown that a much higher dynamic range is required in order to prevent crosstalk between the two channels of a stereoscopic display, i.e., the left and right eye images (see, for example, Lipton, "Factors affecting 'ghosting' in time-multiplexed planostereoscopic CRT display systems," SPIE Proceedings, Vol. 761, 1987).

Recent experiments indicate that a dynamic range in the neighborhood of 90:1 is required to produce a satisfactory reduction in crosstalk, or, as it is called in the jargon of stereoscopy, ghosting. Such ghosting manifests itself as a double image. Given the present P22 three color phosphor set employed in color CRT's, improvement beyond a dynamic range of 90:1 does not show any reduction in ghosting, since perceived crosstalk derives from two separate physical entities—the incomplete occlusion of the shutter and the phosphor afterglow continuing into adjacent image fields as described in the above-cited article. However, a new tricolor phosphor set is in development which will have shorter afterglow characteristics, in which case even higher dynamic range electro-optical shutters will be required to produce even lower levels of ghosting.

Surface mode devices have become the preferred electro-optical shutter employed in stereoscopic display devices, because of their good transmission, low cost of manufacture, and most important, because they have a brief transition or switching time between transmission and occlusion, and vice versa. Unlike the prior art twisted nematic devices, surface mode devices have a switching time measured in the millisecond range, whereas twisted nematic devices have a transition time measured in the tens of milliseconds. A field sequential electronic stereoscopic display in which the image fields are separated by a vertical blanking interval, typically of a millisecond or less, must employ a selection device with its shutter's transition time of about the same duration as the blanking.

Attempts have been made to improve the dynamic range of electro-optical shutters by employing two surface mode liquid crystal cells in optical series. One approach is called the push-pull device (U.S. Pat. No. 4,792,850, issued Dec. 5, 1989, to Lipton et al.), and another method is employed by Havens ("A Liquid Crystal Video Stereoscope with High Extinction Ratios, a 28% Transmission State, and 100-Microsecond Switching," SPIE Proceedings, Vol. 761, pp. 23-26, 1987). In both devices the shutters are made of two cells in optical series, driven electrically out of phase. The result is an improvement in dynamic range, but with an increased cost of manufacture, higher power consumption, and greater weight.

For a selection device such as CrystalEyes ®, which is currently manufactured by StereoGraphics Corporation, it is desirable to use a liquid crystal shutter constructed of a single cell because weight, power consumption, and manufacturing cost will increase with a dual cell approach. CrystalEyes ® wireless eyewear is made up of liquid crystal lenses driven in synchronization with the video field rate through an infrared communications link, and is described in U. S. Pat. No. 4,884,876, issued Dec. 5, 1989 to Lipton, et al., and in pending U.S. Pat. application Ser. No. 387,622, filed Jul. 31, 1989 by Lipton, et al, now U.S. Pat. No. 4,967,268.

StereoGraphics Corporation has been manufacturing the CrystalEyes ® product with an achromatic surface mode liquid crystal device of the type described in above-referenced U.S. Pat. No. 4,884,876. This device has a very high on-axis dynamic range. The mean dynamic range of lenses sampled in manufacture is greater than 150:1, exceeding the requirements of the present P22 phosphor set. If it were required, lenses with a dynamic range of 400:1 or better could be manufactured using this method.

Despite the fact that the achromatic shutter uses a single cell and is light weight, and uses less power than a double cell configuration such as those described above, it requires the application of three laminated layers, rather than the two layers which are usually used with a liquid crystal shutter of the generic type shown in FIG. 8. The two layers referred to are plastic linear polarizer sheets 2 and 4 (shown in FIG. 8), each mounted on either side of liquid crystal cell 6 (shown in FIG. 8). Typically, where cell 6 is a surface mode cell, the director alignment rub axis of the surface mode cell bisects the axes of the polarizers 2 and 4, which are aligned orthogonally.

The achromatic shutter of U.S. Pat. No. 4,884,876 meets the requirements of a high performance selection device, but it is more costly to manufacture than a conventional shutter (of the type shown in FIG. 8) which uses only two laminated layers of polarizer, because the achromatic shutter requires an additional layer. This additional layer is a quarter wave retarder placed between the cell and one of the polarizers. The polarizer which is laminated in juxtaposition to the retarder needs to be adjusted on a lens-by-lens basis in order to produce the highest possible dynamic range. This is a time consuming procedure which has required the building of a special assembly machine. In practice the actual through-put of lenses is restricted by the critical final alignment step.

Therefore, it would be desirable to design an alternative means of producing a high dynamic range shutter without the alignment step with a corresponding reduction in manufacturing cost. Not only would such a shutter reduce the cost of manufacture of the present product, but it would make possible new selection device eyewear for markets requiring a product with a low cost of manufacture. However, until the present invention, it was not known how to design such a shutter.

SUMMARY OF THE INVENTION

The invention is a high dynamic range electro-optical shutter for stereoscopic and other applications, and a method for increasing the dynamic range of an electro-optical shutter system. The inventive shutter is derived from an existing electro-optical shutter by adjusting the tilt or tip angle of the plane o the shutter's surface in the optical path of the apparatus in which it is employed. It has been found that light rays traversing an electro-optical shutter which are not perpendicular to the plane in which a surface of the shutter lies, can have a significantly higher dynamic range than axial rays. Accordingly, the angle at which the shutter is mounted in an apparatus can be adjusted to produce a dynamic range which is high enough for the intended application. By mapping the pattern of spatial distribution of dynamic range, it is possible to produce shutters which are low in manufacturing cost, yet have performance which equals that of more costly shutters.

BRIEF DESCRIPTION OF THE DRAWINGS

FIG. 3 is a chart of the spatial dynamic range distribution for a 7 micron gap achromatic shutter.

FIG. 4 is a chart of t he spatial dynamic range distribution for a 9 micron gap shutter with orthogonal polarizers.

FIG. 5 is a chart of the spatial dynamic range distribution for a 7 micron gap shutter with orthogonal polarizers.

FIG. 6 is a chart of the spatial dynamic range distribution for a 6 micron gap shutter with orthogonal polarizers.

FIG. 7b is a side view of the eyewear shown in FIG. 7a.

DESCRIPTION OF THE PREFERRED EMBODIMENTS

The expressions "electro-optical shutter" and "shutter" are used herein to denote a class of devices including any combination of electro-optical cells (such as liquid crystal cells), polarizers, and lenses. The invention improves the dynamic range of conventional electro-optical shutters, such as the sandwich of polarizer, electro-optical device, and polarizer, shown in generic form in FIG. 8.

Figures 1, 2:
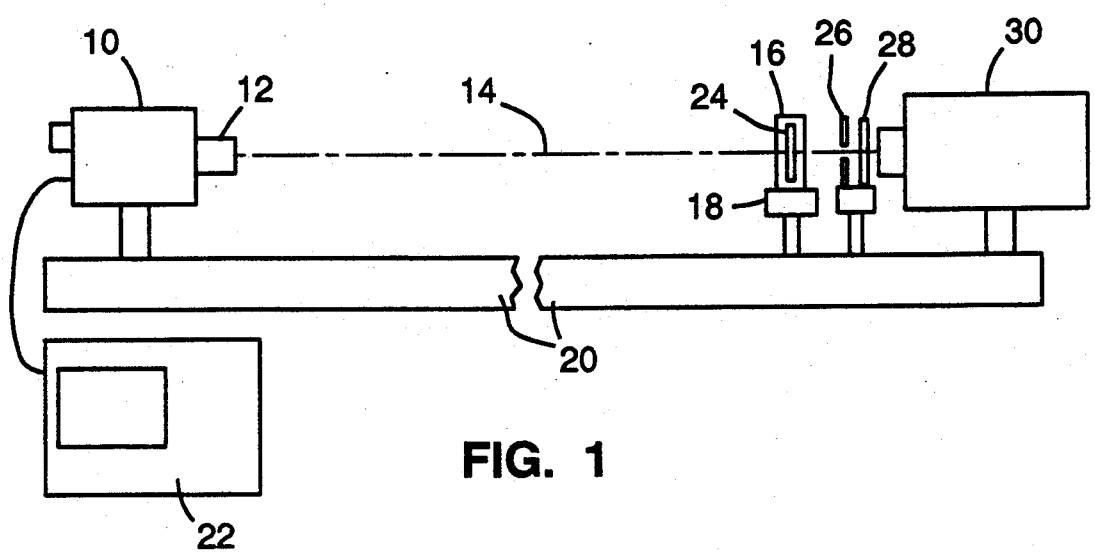
FIG. 1 is a side view of an optical bench system used in experiments described herein, showing the principal axis of the system.
FIG. 2 is a chart of the spatial dynamic range distribution for a pair of crossed polarizers.

The charts to be described below with reference to FIGS. 2 through 6 were obtained using an optical bench of the type shown in FIG. 1, which includes photometer 10 (a Hagner Universal Photometer) whose output is supplied to oscilloscope 22 (an Hitachi V212 oscilloscope). Photometer 10, and other devices shown in FIG. 1, are mounted on optical rail 20. Mounted at the end of optical rail 20 (which is approximately 5-feet long) facing photometer 10 is tungsten-halogen light source 30. Source 30 illuminates ground glass screen 28, which is mounted on rail 20 between source 30 and photometer 10. The light passing through the ground glass screen is modulated by an iris diaphragm 26.

Mounted between diaphragm 26 and photometer 10, in close proximity to light source 30, is a holder in which an electro-optical shutter 24 may be mounted for testing and measurement. The holder includes vertical rotation stage 16 and horizontal rotation stage 18, for rotating an electro-optical shutter 24 in both the vertical and horizontal directions. Both horizontal and vertical rotation stages have scales which are marked in degrees. When looking down on horizontal stage 18 from a position above the optical bench, the readings in degrees increase with a clockwise rotation. When looking at vertical rotator 16 from the side view, as shown in FIG. 1, with photometer 10 at the left and light source 30 at the right, a clockwise rotation increases the angular measure in degrees.

The apparatus of FIG. 1 has been described so that the reader will understand the coordinate system which is used in FIGS. 2 through 6. In FIGS. 2-6, the readings on the rotation stages are used as the basis for the coordinate system.

To generate the charts of FIGS. 2-6, various polarizers and electro-optical shutters 24 were placed in the holder and rotated in the vertical and horizontal directions in increments of five degrees. Measurements of dynamic range were made at each increment, for the principal ray of light traversing shutter 24. The principal ray is the ray which is coaxial with optical axis 14 of photometer 10's lens 12, which passes through the center of the shutter being measured. When the principal ray is normal to the surface of the shutter, or lies in a line which is perpendicular to the plane of the shutter, we call it an axial ray, and the rotation stages will read 0 degrees horizontal and 0 degrees vertical. The definition of the principal ray is given by Cox, in "Photographic Optics", fifteenth revised edition, Focal Press, 1974.

The dynamic range spatial distribution patterns shown in FIGS. 2 through 6 graphically represent the dynamic range produced by the principal light ray traversing polarizers and various electro-optical shutters at different angles to the surface of the shutter.

As Cox (cited above) points out, the concept of the principal ray is an abstraction which in practice "cannot be realized, since it is not possible to define anything as inexact as the diameter of a ray of light. But if the lens is stopped down to about f64, the rays which go through it are following so nearly the same path, that it is not stretching things too far to think of them as being a single ray filling the small lens aperture." Although Cox is specifically discussing photographic lenses with refractive properties, and for the lenses and electro-optical shutters discussed here we are not concerned with refractive properties (but rather with ability to modulate light), the cited discussion from Cox may be applied in the present context. The principal ray may be approximated on the optical bench of FIG. 1 by using iris diaphragm aperture 26 located in front of ground glass screen 28.

For the 0 degrees horizontal, 0 degrees vertical (0/0) position, as stated above, the principal ray is perpendicular to the plane of shutter 24, while principal rays traversing shutter 24 when it is rotated to some value other than 0/0 are called off-axial rays. We consider the principal ray to be coaxial with the axis of photometer lens 12 in the particular case of the optical bench shown in FIG. 1, or to be parallel with the lens axes of a viewer's eyes when viewing though a stereoscopic selection device like that shown in FIGS. 7a and 7b.

The rotation stages shown in FIG. 1 were used to locate the plane of the shutter to various angles to the principal ray. As stated above this was done in increments of five degrees for the purpose of taking dynamic range measurements. These measurements were made by looking at the oscilloscope trace of the signal outputted to oscilloscope 22 by photometer 10 in response to light modulated by shutter 24 as it actively occluded. These measurements were made by techniques well known to workers ordinary skill in the field.

FIG. 2 shows the dynamic range spatial distribution pattern for a pair of sheet polarizers (Sanritsu Electric Co. part number LLC2-9218SF polarizers). The dynamic range (or "contrast ratio") shown in each of the eighty-one boxes of the chart in FIG. 2, is also known as the "extinction ratio" when applied to sheet polarizers. The dynamic range is defined as the ratio of the transmission of light through the shutter in its open state to the transmission of the shutter in its occluded state. For sheet polarizers the extinction ratio is the ratio of the transmission of light through two linear polarizers with their axes parallel, to the transmission of the two polarizers with their axes orthogonal. Other polarizers, such as Nitto NPFG1220DU show similar dynamic range spatial patterns.

There are two high dynamic range zones, which for didactic purposes we have restricted to those values above 700:1. Each zone consists of a set of eight boxes indicating a dynamic range of 758:1 or 827:1. These zones have been made more distinct by the addition of halftone shading. (This half-tone shading convention has also been used in FIGS. 3 through 6). The lowest dynamic range values will be found in the extreme four corners of the dynamic range spatial distribution pattern.

In FIG. 2 there is one high dynamic range zone in the upper left hand quadrant, and one in the lower right hand quadrant. The zone patterns look like two L-shapes, whose corners are facing each other, hence we will call this the dual L-pattern. Further, by looking at FIGS. 4 through 6, the reader will observe that the liquid crystal shutters whose dynamic ranges are represented by these spatial distribution patterns have similar highest dynamic range zones in their upper left and lower right quadrants.

We postulate that the electro-optical shutters of FIGS. 4, 5, and 6 modulate the spatial distribution pattern produced by the polarizers characterized by FIG. 2 since we observe that the highest dynamic range values are in the same quadrants. The shutters characterized by FIGS. 4, 5, and 6 are manufactured as has been described above and shown in FIG. 8, by using sheet polarizers with orthogonally oriented axes, laminated to the outside surfaces of an active liquid crystal device. We will return to a discussion of the dynamic range spatial distribution patterns of these shutters after a few remarks about FIG. 3.

FIG. 3 shows the pattern for an achromatic device of the type described in referenced U.S. Pat. No. 4,884,876. As may be seen, the high dynamic range pattern (arbitrarily including only those values greater than 160:1) which has been formed here is cross-shaped. The achromatic device, it is believed, changes the dual L-shaped pattern into a single cross shape pattern. One might imagine that the two polarizer quadrants are literally shifted and brought together to meet at a point in the center (position 0/0), to form a cross. Clearly the dynamic range spatial distribution pattern for the achromatic shutter is similar to that of the crossed polarizers, with both showing the lowest values for dynamic range in the four corners of the graph. While there is a remarkable improvement in dynamic range for on-axis rays using the achromatic device of FIG. 3 (relative to the devices of FIGS. 4, 5, and 6), for some off-axis rays, those near the corners of the box shaped graph, there is a reduction in dynamic range. This is important to note because even the achromatic shutters are typically mounted at some angle to the optical axis or principal ray of the eye's lens when viewing through the eyewear, as is shown in the illustrations in FIGS. 7a and 7b.

Figure 7A:
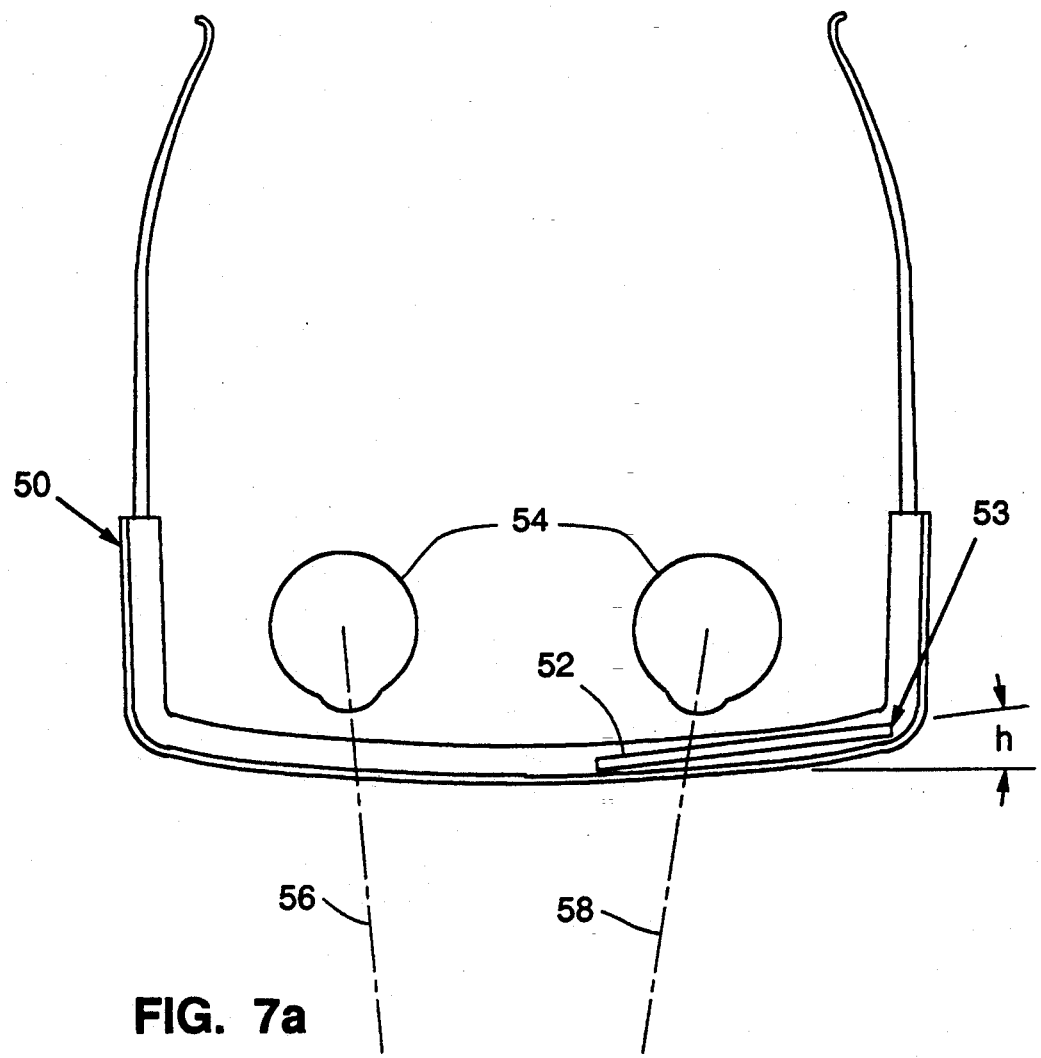
FIG. 7a is a top view of a pair of eyewear including the inventive liquid crystal shutters.
Figure 7B:
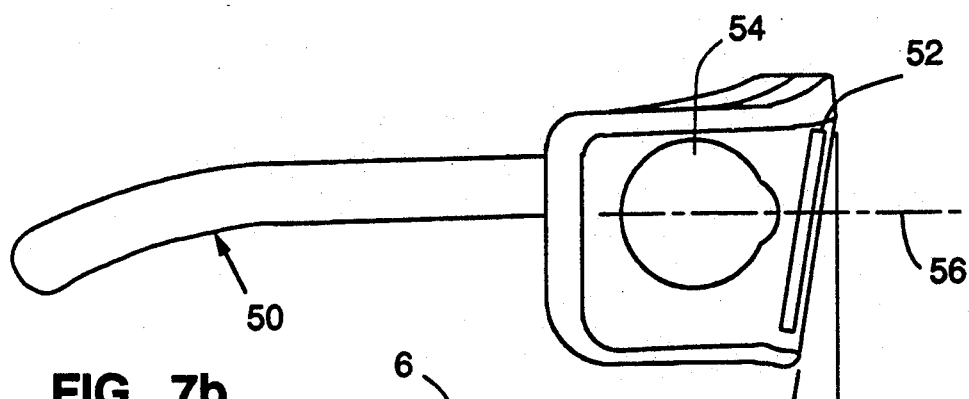

FIG. 7a shows stereoscopic eyewear 50 which employs liquid crystal shutters 52 (only one of which is shown) in which the eyewear is viewed from above. FIG. 7b is a side view of the eyewear of FIG. 7a. Note that the tip or tilt angle at which shutter 52 is set in eyewear 50 is shown in FIG. 7a to be $h$ degrees to the horizontal (i.e., h degrees from a normal to a plane of symmetry midway between the viewer's eyes 54) and is shown in FIG. 7b to be $v$ degrees to the vertical. Note that the tip or tilt angle is made up of two components, angles h and v. Liquid crystal shutter 52 is flat, so that the surfaces of its component parts are contained within a plane.

In order to design eyewear that will fit comfortably, it is often desirable to design the eyewear to include mounting sockets 53 oriented to turn shutters 52 in both the vertical and in the horizontal directions as shown in FIGS. 7a and 7b. However, when shutters 52 are so mounted in the eyewear mounting sockets 53, the light rays which are passing through the lens to the viewer's eyes 54 are now no longer perpendicular to the surface of each shutter.

Moreover, because human eyes converge inward when looking at a display screen at a finite distance (typically 3 feet in a workstation application for viewing computer graphics) as indicated in FIG. 7a by the angle between right eye axis 56 and left eye axis 58, an additional angle of approximately 3 degrees must be added to angle h so that the total tip angle may be given by h+3 degrees. (When viewing a display screen at a very great distance axes 56 and 58 would be parallel.

Accordingly, the high dynamic range which is a characteristic of the achromatic lens, which is available for on-axis rays, may not be available for the user's eyes, because the eyes' lenses axes pass through the electro-optical shutters non-axially. The optical axis of the eye, which passes through the center of the eye's lens and which also passes through the fovea centralis, will then pass through the liquid crystal lens at some off-axial angle.

We observe from FIG. 3 that the achromatic shutter will not have its maximum dynamic range where it is desired, with reference to FIGS. 7a and 7b, in the case that angles h and v depart significantly from 0 degrees. On the other hand, we see that the L-shaped dynamic range spatial distribution patterns, as shown in FIGS. 2, 4, 5, and 6, may have better dynamic range where it is needed when the shutter is mounted at an appropriate angle in eyewear or in an optical system.

In all cases, for the liquid crystal cells in the shutters described here, we have used Merck ZLI-1565 liquid crystal material, with a birefringence $\Delta n$ of approximately 0.13, but the cells have different gap widths $d_o$. The shutter of FIG. 4 includes a liquid crystal cell with a 9 micron gap; the shutter of FIG. 5 includes a cell with a 7 micron gap; and the shutter of FIG. 6 includes a cell with a 6 micron gap.

As is well understood in the art, a liquid crystal cell is made up of two flat sheets of glass, the insides of which have been coated with conductive tin indium oxide, to form a capacitor. The electrolyte of the capacitor is the liquid crystal material. The thickness of that electrolyte is determined by the distances which have been given above, between the inside surfaces of the plates of glass: namely 9, 7, and 6 microns. The optical path is given by the well known expression $\Delta n.d$.

By comparison of FIGS. 4, 5, and 6, we see that as $\Delta n.d$, the optical path length of the liquid crystal lens varies, the pattern of dynamic spatial distribution also varies. Given a constant liquid crystal material, the optical path length is reduced as the gap is reduced. Thus, any changes which have been made here as a result of the reduction of the gap thickness could also be obtained by leaving a constant gap thickness, and by changing the liquid crystal material to one with a different birefringence. Thus combinations of gap widths and liquid crystal material will result in different patterns of spatial distribution of dynamic range. As stated earlier, these patterns are actually the pattern of polarizer extinction ratio modulated by the liquid crystal lens. We can see that as the gap thickness is reduced (hence the optical path length), the pattern of FIG. 6 is most like the pattern of the crossed polarizers shown in FIG. 2. It seems reasonable that this would be the case for the part with the shortest optical path.

We have recognized that it is possible to adjust the optical path length of the liquid crystal cell to produce the desired vertical and horizontal angles, v and h, at which the part may be tipped in an optical system, such as eyewear, which will have the highest dynamic range. We have observed that less rotation of the lens is needed for a lens with a short optical path than for a longer optical path length.

By placing a liquid crystal shutter, for example the part whose spatial distribution pattern of dynamic range is shown in FIG. 6, within eyewear (as shown in FIG. 7a and 7b) which has had the tip angles of its lens sockets suitably designed, it will then be possible to have the user's eyes lens axes 56 and 58 pass through the spatial region with the highest dynamic range for the given liquid crystal shutter. For example, for the lens shown in FIG. 6, angles h and v selected by the designer of the eyewear might desirably be selected as follows: 15 and 10 degrees (corresponding to a dynamic range of 312:1 for rotator angles of 345 and 10 degrees). If an achromatic lens had been used, with the spatial distribution pattern as given by FIG. 3, a high dynamic range would be available for the on-axis rays, or rays that are close to the axis, and the eyewear design could be adjusted accordingly.

We have recognized that it is possible to design a liquid crystal shutter so that rays passing through it off-axially provide the highest dynamic range coinciding with the lens axis of the eye, providing that the lens socket of the eyewear is designed to have the appropriate tip angles, h and v. Thus, we can obtain high dynamic range using a shutter with polarizers laminated to either surface of a liquid crystal cell (as in FIG. 8), omitting the retarder layer and alignment steps necessary for manufacture of an achromatic shutter. In other words, we have recognized that a shutter of a given optical path length can be matched to the mechanical design of the eyewear in which it is to be mounted (in particular, the angular orientation of the eyewear's shutter sockets) so that the maximum dynamic range is available for the eyes of the user.

Figure 8:
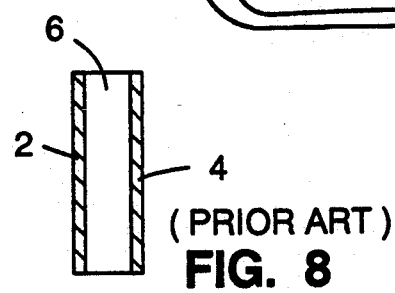
FIG. 8 is a cross-sectional view of a conventional, generic electro-optical shutter.

It will be apparent to the reader that the inventive technique for improving the dynamic range of electro-optical shutters can be applied not only to the design of stereoscopic eyewear but also to the design of other optical systems in which the shutter is placed at a chosen tip angle to the principal light ray in the system's optical path to maximize the dynamic range. Indeed, since the general technique is based on the modulation of the sheet polarizer dynamic range spatial distribution pattern, any type of liquid crystal or other electro-optical shutter which uses sheet polarizers as shown in FIG. 8, may be used according to the teachings of this specification.

Various modifications and alterations in the inventive structure and method will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method, for increasing dynamic range of an electro-optical shutter, wherein the shutter is mounted in a system having an axis, wherein the shutter has a surface oriented at a tip angle to the axis, and wherein the shutter has a dynamic range in response to a principal light ray incident at the surface at said tip angle, including the steps of:

measuring the dynamic range of the shutter over a range of values of said tip angle to determine a first tip angle which results in an increased value of the dynamic range, wherein the first tip angle is such that the principal light ray is not perpendicular to the surface of the shutter when said principal light ray passes through the shutter mounted at said first tip angle; and mounting the shutter in the system with the surface of the shutter at said first tip angle with respect to the axis.

2. The method of claim 1, wherein the electro-optical shutter includes a pair of sheet polarizers; and an electro-optical device mounted between the polarizers, and wherein the tip angle includes a horizontal component and a vertical component.

3. The method of claim 2, wherein the electro-optical device includes a liquid crystal cell.

4. The method of claim 3, wherein the cell is a surface mode liquid crystal cell.

5. An electro-optical shutter system having an axis, and including:

an electro-optical shutter having a surface and a dynamic range in response to light incident at the surface; and means for mounting the shutter in the system at a tip angle with respect to the axis, wherein the tip angle is selected so that the dynamic range of the shutter in response to a principal light ray incident at the surface at s aid tip angle after propagating along the axis is increased relative to the dynamic range of the shutter in response to a light ray incident at the surface at another angle, wherein the principal light ray is not perpendicular to the surface when said principal light ray is incident at said surface at the tip angle.

6. The system of claim 5, wherein the electro-optical shutter includes:
a pair of sheet polarizers; and
an electro-optical device mounted between the polarizers.

7. The system of claim 5, wherein the means for mounting the electro-optical shutter is a pair of eyewear for stereoscopic viewing.

8. A stereoscopic selection device for transmitting radiation to a user's eyes, including:
an electro-optical shutter comprising a sandwich of a first sheet polarizer, an electro-optical device, and a second sheet polarizer, wherein the electro-optical shutter has a surface, and a dynamic range in response to a principal light ray incident at the surface at an incidence angle, wherein the dynamic range is at a maximum when the incidence angle is equal to a first angle; and
a means for mounting the shutter at said first angle with respect to a first of the user's eyes, wherein the means for mounting the shutter orients the shutter such that t he principal light ray is coaxial with an optical axis of the first of the user's eyes, but is not perpendicular to the surface of the shutter when said principal light ray is incident at the shutter.

9. The device of claim 8, wherein the electro-optical shutter includes a liquid crystal cell.

10. The device of claim 9, wherein the liquid crystal cell is a surface mode liquid crystal cell.

* * * * *